United States Patent [19]

Feldtkeller

[11] Patent Number: 5,083,254
[45] Date of Patent: Jan. 21, 1992

[54] STARTING CIRCUIT FOR A SWITCHING POWER SUPPLY HAVING SWITCHING MEANS RESPONSIVE TO A SHUTOFF COMMAND

[75] Inventor: Martin Feldtkeller, Munich, Fed. Rep. of Germany

[73] Assignee: Siemens Aktiengesellschaft, Munich, Fed. Rep. of Germany

[21] Appl. No.: 591,135

[22] Filed: Oct. 1, 1990

[30] Foreign Application Priority Data

Sep. 29, 1989 [EP] European Pat. Off. ........ 89118085.3

[51] Int. Cl.[5] ............................................. H02M 3/335
[52] U.S. Cl. .......................................... 363/21; 363/49
[58] Field of Search ............................... 363/19, 21, 49

[56] References Cited

U.S. PATENT DOCUMENTS

| 4,246,634 | 1/1981 | Purol | 363/49 |
| 4,497,017 | 1/1985 | Davis | 363/49 |
| 4,975,592 | 12/1990 | Hahn et al. | 363/21 |

FOREIGN PATENT DOCUMENTS 249868 12/1985 Japan ................................ 363/49

*Primary Examiner*—William H. Beha, Jr.
*Attorney, Agent, or Firm*—Herbert L. Lerner; Laurence A. Greenberg

[57] ABSTRACT

Modern switching power supplies include an integrated component (IS) which effects the control of the switch (7). The component (IS) is often supplied with the necessary voltage ($U_V$) in its inactive state via a protective resistor (14) and in its active state from a transformer winding (15). When a switch-off command is present at the component (IS), the switch (7) is not switched on; this has the effect that the component (IS) goes into a polling state during which it alternates between its inactive and its active state, the period being defined by the capacitance of the charge capacitor. In order to bring the component (IS) into its active state as soon as the switch-off command ($U_{AB}$) has been taken away, the active state is blocked while the switch-off command is present. Accordingly, the capacitor (13) can immediately give off the supply voltage ($U_V$) necessary for activation, as soon as the switch-off command ($U_{AB}$) is withdrawn.

5 Claims, 2 Drawing Sheets

STARTING CIRCUIT FOR A SWITCHING POWER SUPPLY HAVING SWITCHING MEANS RESPONSIVE TO A SHUTOFF COMMAND

The invention relates to a circuit configuration for a switching power supply, including a transformer having a primary winding connected in the circuit of a direct voltage source in series with an electric switch, and a secondary winding connected to a load; an integratable control circuit for switching the switch on and off, during operation of the switching power supply the control circuit receives a supply voltage from a charge capacitor connected parallel to the control circuit and connected through a start-up resistor to the direct voltage source in a first operating state (inactive state) in which it cannot switch the switch, the control circuit draws the supply voltage from a transformer winding parallel to the charge capacitor in a second operating state (active state) in which it can switch the switch, the control circuit changes from the inactive state to the active state at an increasing supply voltage whenever an input switching threshold is exceeded, and returns from the active state to the inactive state at a decreasing supply voltage whenever a shutoff threshold fails to be attained, and the control circuit does not switch on the switch whenever a shutoff command that can be issued externally is present.

Switching power supplies or switch power packs (SPSs) having such circuits are known in a great variety. An overview of the various SSP concepts is found in the textbook entitled "Schaltnetzteile" [Switching Power Supplies], edited by Joachim Wüstehube and published by Expert-Verlag in Grafenau, Federal Republic of Germany, 1979.

Normally, switching power supplies are provided in order to convert a rectified, smoothed voltage from the mains power supply into at least one stabilized direct voltage, through a transformer connected on the primary side. As a rule, the switch is triggered by an integrated circuit, which not only performs the function of triggering but also that of regulation, along with certain monitoring functions. Several variants of such trigger components which are on the market differ from one another in the type of current supply, among other factors.

For instance, a commercially available control circuit TDA 4605 which is described, for instance, in Siemens Product Information Brochure "IC's für die Unterhaltungselektronik" [IC's for Electronic Entertainment Systems], August 1987 edition, pp. 46-63, is furnished with its supply voltage $U_V$ in the following manner. Until an activation threshold $U_E$ is attained, the energy is drawn from the rectified mains voltage through a start-up resistor, and the supply voltage is picked up from a charge capacitor connected in series with the start-up resistor and in parallel with the control circuit. Such direct feeding from the primary voltage is possible because the circuit consumes relatively little current in its inactive state. When the value $U_E$ is exceeded, the control circuit is activated. In other words, all of the operating points are generated (in particular, the reference voltage with the reference variables derived from it, and the switching thresholds for the UV monitoring). If there is no malfunction at that time, then the switching power supply starts up. The activated control circuit draws a relatively large amount of current. Therefore, it can only be supplied for a very short time by the rapidly discharging charge capacitor, and it then receives its supply voltage from a transformer winding that is connected parallel to the capacitor. Once the switching power supply has started up, this winding furnishes a voltage proportional to the load voltage.

In the course of operation, the switching power supply may enter critical situations, in which it must stop automatically in order to protect certain components against damage. Examples of critical situations in this respect include secondary overload, overheating, or overly low mains voltage. Once operation has been stopped, or in other words once the switching transistor is blocked, then the voltage drawn from the supply winding drops, until it drops below an inactivation threshold $U_A$ ($U_A < U_E$). In that case, the control circuit switches off all of the operating points and returns to its inactive state in which it consumes little current. Correspondingly, the charge capacitor is recharged, and once the voltage $U_E$ is attained it is discharged again. If the switching transistor is still blocked at that time, then the supply winding cannot keep up the supply voltage, which is then dropping. The result is that $U_V$ becomes less than $U_A$, and the control circuit begins a new "polling cycle" again from the inactive state. This polling mode, in which the turn-on hysteresis is periodically run through, persists until such time as the switching power supply is enabled for a new start-up. The time needed for the supply voltage to rise from $U_A$ to $U_E$ is determined essentially by the resistance of the start-up resistor and the capacitance of the charge capacitor. For safety reasons, it is selected in such a way that after the enabling of the transistor, a new start-up attempt can ensue only after a certain delay, which may amount to up to approximately one second.

For a number of applications, there is a need for the trigger component to be inactivatable by an external signal as well. For example, it should be possible to switch a television set to "standby" operation at a freely selectable time. In this respect it would be desirable for the set to start up immediately once the shutoff command had disappeared, rather than after a delay that may persist for up to one second.

It is accordingly an object of the invention to provide a circuit configuration for a switching power supply, which overcomes the hereinafore-mentioned disadvantages of the heretofore-known devices of this general type and to expand the circuit configuration described initially above with the simplest possible switching means, so that the switching power supply returns to normal operation as quickly as possible once the shutoff command has ended.

With the foregoing and other objects in view there is provided, in accordance with the invention, a circuit configuration for a switching power supply, comprising an electric switch; a transformer having a primary winding in a circuit of a direct voltage source connected in series with the electric switch, and a secondary winding to be connected to a load; an integratable control circuit connected to the switch for switching the switch on and off; a charge capacitor connected parallel to the control circuit; a start-up resistor connected between the charge capacitor and the direct voltage source; another transformer winding connected parallel to the charge capacitor, means for feeding an externally issued shutoff command to the control circuit; during operation of the switching power supply in a first operating state in which the control circuit cannot switch the switch, the control circuit receives a supply voltage from the charge capacitor, in a second operating state in which the control circuit can switch the switch, the control circuit draws the supply voltage from the other transformer winding; when the supply voltage is increasing the control circuit changes from the first operating state to the second operating state whenever an input switching threshold is exceeded, and when the supply voltage is decreasing the control circuit returns from the second operating state to the first operating state whenever a shutoff threshold fails to be attained; and the control circuit does not switch on the switch whenever the externally issued shutoff command is present; and switching means for preventing the control circuit from changing to the second operating state when a shutoff command is present.

In accordance with another feature of the invention, the first operating state is an inactive state, and the second operating state is an active state.

In accordance with a further feature of the invention, the switching means includes a turn-on flip-flop being set by a set signal for changing the control circuit to the active state, the set signal being short-circuited when the shutoff command is present.

In accordance with an added feature of the invention, there is provided a first line carrying the shutoff command, a second line carrying the set signal, and a transistor having a collector-to-emitter path connected between the second line and ground, and a base connected to the first line.

In accordance with an additional feature of the invention, there is provided a clamping circuit limiting the supply voltage to a maximum value.

In accordance with a concomitant feature of the invention, the clamping circuit is a series element being connected between the supply voltage and ground and having a resistor and a Zener diode.

Other features which are considered as characteristic for the invention are set forth in the appended claims.

Although the invention is illustrated and described herein as embodied in a circuit configuration for a switching power supply, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
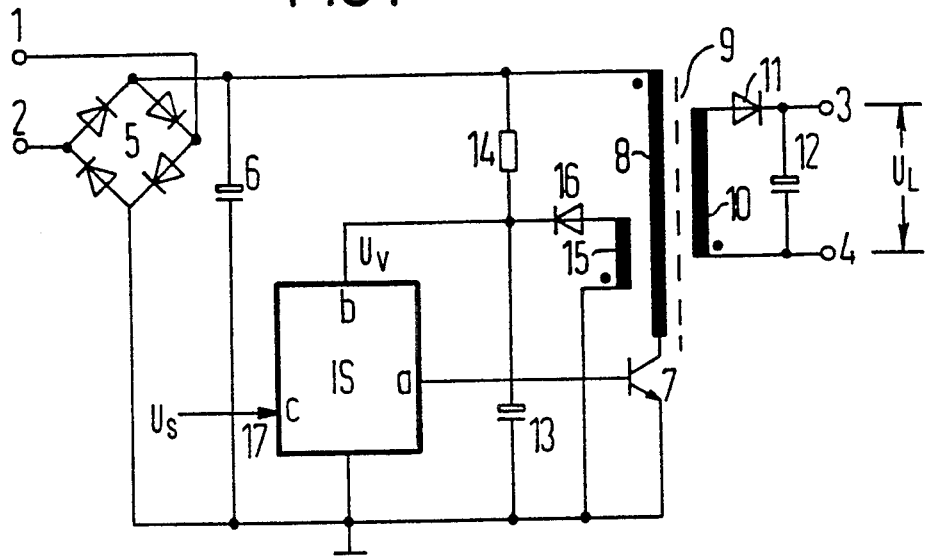
FIG. 1 is a simplified schematic and block circuit diagram of a circuit configuration of a typical switching power supply according to an exemplary embodiment of the invention.

For the sake of simplicity, elements of the circuit configuration that are not absolutely necessary for a comprehension of the invention have been omitted from the drawing. For a complete explanation of the circuit, reference may be made to the aforementioned Siemens product brochure and to U.S. application Ser. No. 470,250, now U.S. Pat. No. 4,984,145.

Referring now in detail to the figures of the drawings, in which elements that are equivalent to one another are provided with the same reference numerals, and first, particularly, to FIG. 1 thereof, there is seen a switching power supply or switch power pack which is a free-running blocking oscillator converter or flyback converter, that draws a mains voltage at terminals 1 and 2 and furnishes a stabilized direct voltage at terminals 3 and 4. For this purpose, the mains voltage is rectified in a rectifier 5, smoothed in a capacitor 6, and then carried through a switching transistor 7 to a primary winding 8 of a transformer 9. In the flux phase, in which the switching transistor is made conducting, the transformer consumes energy. In the blocking phase, in which the switching transistor 7 blocks, it gives up this energy to a non-illustrated load, located between the terminals 3 and 4. In this process, a current that is respectively rectified and filtered in a rectifier 11 and a capacitor 12 flows in the load circuit in a secondary winding 10.

The switching transistor 7 is triggered with pulse width modulation by means of an integrated control circuit IS, for which purpose the aforementioned TDA 4605 may, for instance, be used. The trigger pulse is output by the control circuit at a pin a and carried to the base of the switching transistor 7.

The control circuit receives its supply voltage $U_V$ at a pin b. If $U_V$ exceeds a value $U_E$, which is approximately 11 V, then the control circuit is activated and consumes a current of 10 mA. If $U_V$ drops below a value $U_A$, which is approximately 6 V, then the control circuit returns from its second operating state or active state to its first operating state or inactive state, in which it consumes a current of only approximately 1 mA. In the inactive state, $U_V$ is drawn from a charge capacitor 13, which is connected parallel to the control circuit and is charged through a protective resistor 14 directly from the rectified and smoothed mains voltage. In the activated state, the control circuit is supplied by a voltage that is drawn from a secondary supply winding 15 of the transformer 9 and rectified in a rectifier 16. A branch constructed of the supply winding 15 and the rectifier 16 is connected parallel to the charge capacitor 13 and to the control circuit IS.

Figure 2:
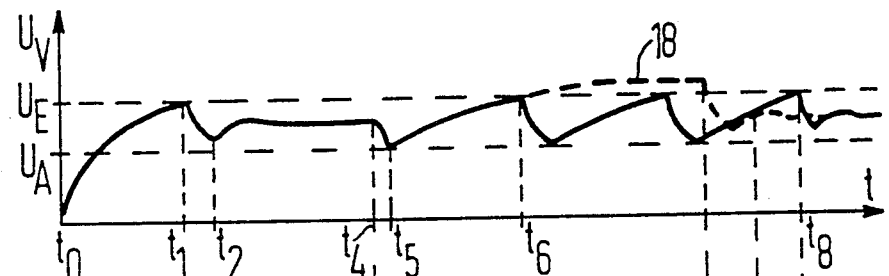
FIG. 2 is a graph of a supply voltage $U_V$ of a control circuit being plotted as a function of time t.
Figure 3:
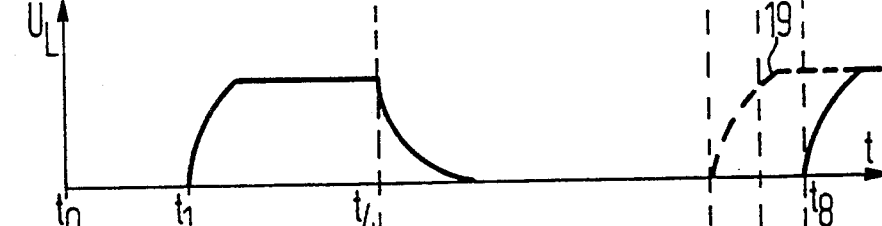
FIG. 3 is a graph of an output voltage $U_L$ of the switching power supply, which is shown in the same form as in FIG. 2.
Figure 4:
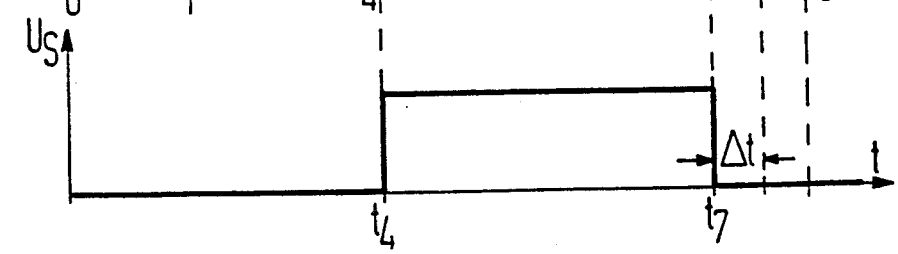
FIG. 4 is a graph of a turnoff voltage $U_S$ being plotted as a function of time t.

Once the set or system has been put into operation, the course of the supply voltage $U_V$ and the load voltage $U_L$ present at the terminals 3, 4 is as respectively shown in FIGS. 2 and 3. These functions are varied by a shutoff command $U_S$, indicated by an arrow 17, being issued from the outside to a pin c of the control circuit IS. This command is plotted in FIG. 4 as a function of the time t.

Once the mains voltage is applied at a time $t_0$, $U_V$ increases up the value $U_E$ at a time $t_1$. At $t_1$, the switching power supply begins to start up. In other words, the load voltage $U_L$ begins to increase, with the result that the supply voltage $U_V$ drawn from the charge capacitor decreases. With increasing load voltage, the voltage output by the supply winding increases as well, and then this voltage supports the supply voltage from a time $t_2$ on and in the steady state it stabilizes at a predetermined level.

If the pin c then receives a shutoff signal at a time $t_4$, $U_L$ and thus the voltage $U_V$ furnished by the supply winding collapse down to $U_A$ at a time $t_5$. The control circuit is then inactivated, it draws little current, and it correspondingly receives an increasing supply voltage, until it is reactivated at a time $t_6$, causing $U_V$ to drop again accordingly. Since the shutoff signal $U_S$ is still present, the switching transistor 7 remains off, so that a new polling cycle begins. At a time $t_7$, $U_S$ disappears. It can then last virtually one entire charge period for the capacitor, as the diagrams show, until the control circuit is reactivated at a time $t_8$.

Figure 5:
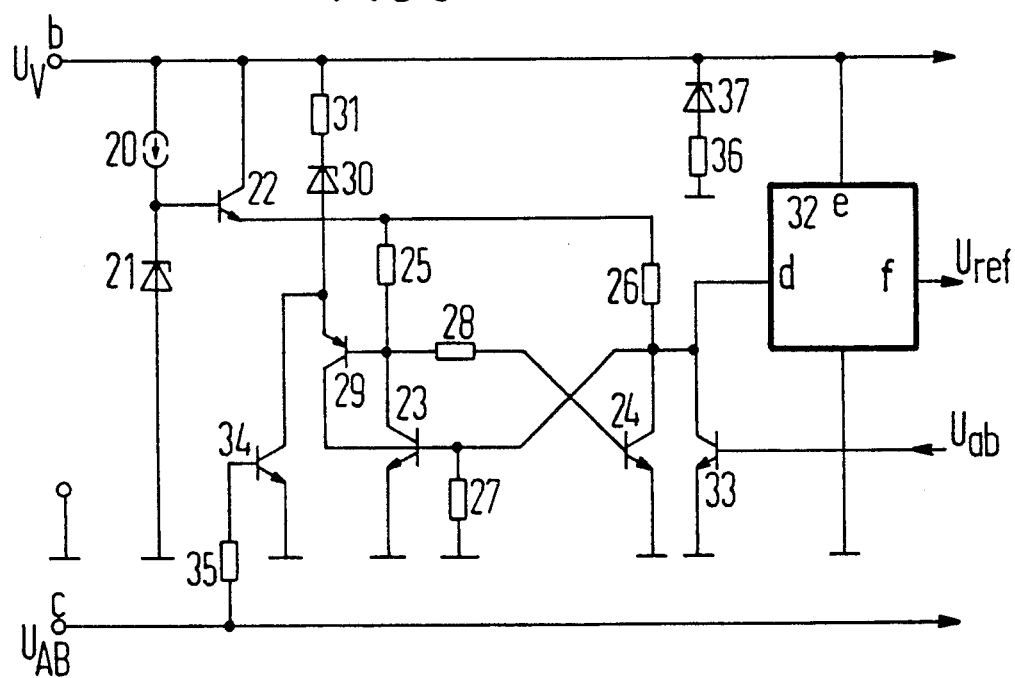
FIG. 5 is a circuit diagram of an exemplary embodiment of the invention, in which the only part of the circuit configuration that is shown is a portion of the integrated circuit.

In order to markedly reduce this delay, the invention provides that the control circuit is not activated whenever a shutoff signal is present at the pin c. In that case, the capacitor cannot discharge (in fact, it is charged further), so that upon the disappearance of the signal, a voltage ($U_V > U_E$) is immediately available and the switching power supply can begin to start up immediately. $U_V$ and $U_L$ then take a course as indicated in FIGS. 2 and 3 by respective curves 18 and 19. The period of time after the disappearance of the shutoff signal, after which the set is again in operation at full power $\Delta_t$), is reduced to a minimum. FIG. 5 shows the switching means that can be used to block the activation of the component when a shutoff command is present. The supply voltage received at the pin b by the control circuit is held at a predetermined value, for instance approximately 7 V, by a prestabilizer, which is constructed as a control source 20, a Zener diode 21 and a transistor 22. A flip-flop is supplied with the prestabilized voltage. In the various base circuits, the flip-flop includes transistor 23, 24, collector resistors 25, 26, and resistors 27, 28. The collector-to-emitter paths of the two transistors are each connected through a respective collector resistor, between the emitter of the transistor 22 and ground. The collector of the transistor 23 is connected to the base of a p-n-p transistor 29. The emitter of the transistor 29 is applied to the supply voltage through a Zener diode 30 and a protective resistor 31. The collector of the transistor 29 is carried to the base of the transistor 23, to the collector of the transistor 24 and to one input d of a reference voltage source 32. A series element including the resistor 31, the Zener diode 30 and the transistor 29, generates a set signal for the flip-flop over a second line as a function of the level of the supply voltage. At $U_V > U_E$, the set signal furnishes a logical "1" and at $U_V < U_A$ it furnishes a logical "0" to the reference voltage source 32. The reference voltage source, which receives the supply voltage $U_V$ through an input e, outputs a reference voltage $U_{ref}$ to an output f if, and only if, a "1" is applied to the input d.

In order to assure that the reference voltage source 32 will receive a "0" when $U_V < U_A$, a further transistor 33 is connected parallel to the transistor 24. The base of the transistor 33 is acted upon by a shutoff signal $U_{ab}$ formed when $U_V < U_A$, and the flip-flop is reset when this signal is present.

In order to ensure that the flip-flop cannot be set when a shutoff command $U_{AB}$ is applied through a first line to the pin c, the emitter of the transistor 29 is connected through the collector-to-emitter path of a transistor 34 to ground. The shutoff command acts through a resistor 35 on the base of the spanning transistor, with the result that in the presence of the command, the emitter of the transistor 29 is short-circuited to ground, and thus the flip-flop cannot be set. The shutoff input c is also connected to a non-illustrated output stage of the component. If a shutoff command is present, then the start pulses for the switching transistor are blocked.

In order to ensure that the supply voltage will not rise above its allowable limit value during the period in which a shutoff command is present at the control circuit, this supply voltage is clamped internally to a lower value, specifically by a series element in the form of a clamping circuit being connected to ground and having a resistor 36 and a Zener diode 37.

The invention is not limited to the exemplary embodiment which is shown. It is applicable whenever an integrated control circuit can be inactivated by an external command and is intended to resume all its functions immediately after its reactivation, during the time that a switching power supply is switched on. Accordingly, it does not matter, for instance, whether the switching power supply is constructed as a depletion converter or as a conducting converter, if it is self-oscillating or has a fixed frequency, if it includes one circuit or more than one circuit, if it furnishes one load voltage or plural load voltages, or if it supplies the trigger component through a primary winding or through a secondary winding.

I claim:

1. Circuit configuration for a switching power supply, comprising:
   1) an electric switch;
   2) a transformer having
      a) a primary winding in a circuit of a direct voltage source connected in series with said electric switch, and
      b) a secondary winding to be connected to a load;
   3) an integratable control circuit connected to said switch for switching said switch on and off;
   4) a charge capacitor connected parallel to said control circuit;
   5) a start-up resistor connected between said charge capacitor and the direct voltage source;
   6) another transformer winding connected parallel to said charge capacitor,
   7) means for feeding an externally issued shutoff command to said control circuit;
   8) during operation of the switching power supply
      a) in an inactive state in which said control circuit cannot switch said switch, said control circuit receives a supply voltage from said charge capacitor,
      b) in an active state in which said control circuit can switch said switch, said control circuit draws the supply voltage from said other transformer winding;
      c) when the supply voltage is increasing said control circuit changes from the inactive state to the active state whenever an input switching threshold is exceeded, and when the supply voltage is decreasing said control circuit returns from the active state to the inactive state whenever a shutoff threshold fails to be attained; and
      d) whenever the externally issued shutoff command is present, the supply voltage reaches a level exceeding the input switching threshold, but said control circuit does not switch on said switch; and
   9) switching means for preventing said control circuit from changing to the active state when a shutoff command is present.

2. Circuit configuration according to claim 1, wherein said switching means includes a turn-on flip-flop being set by a set signal for changing the control circuit to the active state, the set signal being short-circuited when the shutoff command is present.

3. Circuit configuration according to claim 2, including a first line carrying the shutoff command, a second line carrying the set signal, and a transistor having a collector-to-emitter path connected between the second line and ground, and a base connected to the first line.

4. Circuit configuration according to claim 1, including a clamping circuit limiting the supply voltage to a maximum value.

5. Circuit configuration according to claim 4, wherein said clamping circuit is a series element being connected between the supply voltage and ground and having a resistor and a Zener diode.

* * * * *